(12) United States Patent
Kordosky et al.

(10) Patent No.: US 10,822,253 B2
(45) Date of Patent: *Nov. 3, 2020

(54) ANION REMOVAL FROM WASTE WATER

(71) Applicant: Winner Water Services, Sharon, PA (US)

(72) Inventors: Gary Alan Kordosky, Tucson, AZ (US); David Bruce Dreisinger, British Columbia (CA); Michael Schrock, Cranberry Township, PA (US)

(73) Assignee: Winner Water Services, Sharon, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/562,818

(22) Filed: Sep. 6, 2019

(65) Prior Publication Data

US 2019/0389742 A1 Dec. 26, 2019

Related U.S. Application Data

(62) Division of application No. 15/621,801, filed on Jun. 13, 2017, now Pat. No. 10,442,703.

(Continued)

(51) Int. Cl.
*B01D 11/00* (2006.01)
*C02F 1/26* (2006.01)
(Continued)

(52) U.S. Cl.
CPC .......... *C02F 1/26* (2013.01); *C02F 2101/101* (2013.01); *C02F 2101/106* (2013.01);
(Continued)

(58) Field of Classification Search
CPC . B01D 11/00; B01D 11/0426; B01D 11/0492; B01D 2011/002;
(Continued)

(56) References Cited

U.S. PATENT DOCUMENTS 3,257,164 A * 6/1966 Drobuick ................ C22B 34/22
423/63
3,649,219 A 3/1972 Lynn et al.
(Continued)

FOREIGN PATENT DOCUMENTS

CA 749 434 A 12/1966
SU 861 313 A1 9/1981
(Continued)

OTHER PUBLICATIONS

Hanson et al., Extraction of Magnesium Chloride from Bringes Using Mixd Ionic Extractands, Journal of Inorganic and Nuclear Chemistry, Jan. 1, 1975, 191-198, vol. 37, Pergramon Press Ltd., Oxford, GB.

*Primary Examiner* — Allison G Fitzsimmons
(74) *Attorney, Agent, or Firm* — Fay Sharpe LLP (57) ABSTRACT

Methods for removing anions from an aqueous solution include contacting the aqueous solution with an initial organic phase composition in a primary stage to form a first mixture, the initial organic phase composition including a quaternary amine and a weak organic acid; separating a nitrate-depleted raffinate from the first mixture; mixing the remaining organic phase (now containing nitrate) with a first basic solution to obtain a second mixture; separating an aqueous phase sulfate-containing scrub solution from the second mixture; mixing the remaining organic phase with a second basic solution to form a third mixture; and separating the third mixture into an aqueous phase nitrate-rich solution and a secondary organic phase composition. The secondary organic phase composition can be recycled. The raffinate, the sulfate-containing scrub solution, and the nitrate-rich solution can then be further processed.

20 Claims, 9 Drawing Sheets

Related U.S. Application Data (60) Provisional application No. 62/349,266, filed on Jun. 13, 2016.

(51) Int. Cl.
*C02F 103/10* (2006.01)
*C02F 101/10* (2006.01)
*C02F 101/16* (2006.01)

(52) U.S. Cl.
CPC .... *C02F 2101/163* (2013.01); *C02F 2103/10* (2013.01); *C02F 2303/16* (2013.01)

(58) Field of Classification Search
CPC .............. B01D 2011/005; B01D 37/00; B01D 2257/00; B01D 2257/30; B01D 2257/302; B01D 2257/40; B01D 2257/404; C02F 1/00; C02F 1/001; C02F 1/26; C02F 9/00; C02F 2101/00; C02F 2101/10; C02F 2101/101; C02F 2101/106; C02F 2101/16; C02F 2101/163; C02F 2103/00; C02F 2103/06; C02F 2103/10
USPC ........................................ 210/639
See application file for complete search history.

(56) References Cited

U.S. PATENT DOCUMENTS

| | | | |
|---|---|---|---|
| 4,661,257 A | 4/1987 | Kreevoy et al. | |
| 5,158,603 A * | 10/1992 | Stierman | C02F 1/26 |
| | | | 75/743 |
| 8,585,903 B2 | 11/2013 | Monzyk et al. | |

FOREIGN PATENT DOCUMENTS

| WO | WO 86/05477 A1 | 9/1986 |
|---|---|---|
| WO | WO 2014/115134 A1 | 7/2014 |

\* cited by examiner

ANION REMOVAL FROM WASTE WATER

CROSS-REFERENCE TO RELATED APPLICATIONS

This application is a divisional of U.S. patent application Ser. No. 15/621,801, filed Jun. 13, 2017, now U.S. Pat. No. 10,442,703, which claims priority to U.S. Provisional Patent Application Ser. No. 62/349,266, filed Jun. 13, 2016, the contents of which are fully incorporated by reference herein.

BACKGROUND

The present disclosure relates to systems and methods for removing anions from waste water.

Mining involves the excavation of ore and generates waste material through ore beneficiation or "stripping" to access the valuable ore. The exposure of the waste materials to the environment can result in mine-affected water. Typical concentrations of waste materials in mine affected water are provided Table 1 below:

TABLE 1

| Ion | Content (ppm) | Ion | Content (ppm) | Ion | Content (ppm) |
|---|---|---|---|---|---|
| $Ca^{+2}$ | 466 | $K^{+1}$ | 2.1 | $NO_3^{-1}$ | 215 |
| $Mg^{+2}$ | 248 | $Cd^{+2}$ | 0.001 | $Cl^{-1}$ | 7.2 |
| $Ba^{+2}$ | 0.11 | $Se^{+6}$ | 0.42 | $F^{-1}$ | 3.8 |
| $Na^{+1}$ | 7.6 | $SO_4^{-2}$ | 1535 | $HCO_3^{-1}$ | 521 |

The presence of anions such as selenate ($SeO_4^{2-}$), sulfate ($SO_4^{2-}$), nitrate ($NO_3^{1-}$), and other anions in the waste water may limit discharge. In particular, the selenate and nitrate levels in water discharge are often tightly controlled (e.g., to a selenium level 10 ppb and a nitrate level ≤13 ppm without conversion to ammonium or nitrite).

There are many technologies for treating wastewater. However, the cost of treatment is often high (both capital and operating cost). In addition, the treatment of waste water is sometimes so complex that it is technologically advantageous to set up a treatment "train" or series of technologies to reach the ultimate goal of waste water treatment. For example, where nitrate and selenate ions are both to be removed from a sulfate solution, it may be advantageous to use one process for nitrate ion removal followed by a second process for selenate removal. This may be beneficial if the nitrate ions interfered with the efficient removal of selenate ions from the waste water. It would be desirable to provide cost-effective methods for removing various ions from mine-affected water, primarily selenate, sulfate, and nitrate, but being applicable to other anions depending on the anion content of the water.

BRIEF DESCRIPTION

The present disclosure relates to methods for removing anions, particularly sulfates and nitrates, from water. The water source may be a natural source, or the water could be pre-treated water, or a solution from a membrane concentration process (e.g. reverse osmosis). Briefly, the water, particularly mine drainage water or other mine-affected water, is mixed with an organic phase composition containing a quaternary amine and a weak organic acid. The organic phase preferentially absorbs nitrates in the water. The nitrates are then stripped from the organic phase in further stages. Various anions, such as selenate and sulfate, remain in the water, and the water can be further purified in other downstream processes. This separation of the various anions into different solutions permits different processing steps to be applied to them to eventually obtain cleaned water meeting environmental regulations for anion content.

Disclosed in various embodiments are methods for separating various anions (such as a first anion and a second anion) in a primary aqueous solution, comprising: contacting the primary aqueous solution with an initial organic phase composition in a primary stage to form a first mixture, wherein the initial organic phase composition comprises a quaternary amine and a weak organic acid; separating the first mixture to obtain a first-anion-depleted raffinate and a first-anion-containing organic phase; contacting the first-anion-containing organic phase with a first basic aqueous solution in a secondary stage to form a second mixture; separating the second mixture to obtain a second-anion-containing aqueous scrub solution and a first-anion-rich organic phase; contacting the first-anion-rich organic phase with a second basic aqueous solution in a tertiary stage to form a third mixture; and separating the third mixture to obtain a first-anion-rich aqueous strip solution and a secondary organic phase composition. In particular embodiments, the first anion is nitrate and the second anion is sulfate.

At least a portion of the secondary organic phase composition may be recycled and used as the initial organic phase composition in the primary stage.

In particular embodiments, the weak organic acid has a pKa value in water in the range of about 8 to about 12.

In some embodiments, at least a portion of the sulfate-containing aqueous scrub solution is recycled to the primary stage.

The pH of the first mixture may be from about 2 to about 10. The pH of the second mixture may be from about 5 to about 11. The pH of the third mixture may be about 11 or greater. In particular embodiments, the pH of the second mixture is about 9.5 to about 10, and the pH of the third mixture is about 11.0 or greater (i.e. more alkaline).

The volumetric advance flow ratio of the primary aqueous solution to the initial organic phase composition can vary, depending on the concentration of anions in the primary aqueous solution and the necessary specifications for the water exiting the process. In particular embodiments, the volumetric ratio of the primary aqueous solution to the initial organic phase composition may be about 2:1 or greater, and could be 10:1, 100:1 or greater. In other embodiments, the ratio may be about 1:1 or lower. The general desire is to maximize the absolute amount of nitrate that is separated from the incoming primary aqueous solution. In the solvent extraction art, the distribution ratio refers to the concentration of the species in the organic solution divided by the concentration of the species in the aqueous solution. The separation factor for species A over species B refers to the distribution factor for A divided by the distribution factor for B.

The first basic aqueous solution may comprise sodium hydroxide. The second basic aqueous solution may comprise calcium hydroxide.

Also disclosed herein are methods for removing anions from an aqueous solution. The methods include contacting the aqueous solution with a first organic phase composition in a primary stage to form a first mixture, wherein the first organic phase composition comprises a quaternary amine and a weak organic acid and wherein the aqueous phase comprises water, nitrates, sulfates and selenate; separating a nitrate-depleted raffinate from the first mixture to form a nitrate-containing organic phase that contains nitrates and generally also contains some sulfates; contacting the nitrate-containing organic phase with a sodium hydroxide solution in a secondary stage to form a second mixture, wherein the pH of the second mixture is in the range of about 8 to about 10; separating an aqueous phase sulfate-containing scrub solution from the second mixture to form a nitrate rich organic phase containing nitrates; contacting the nitrate-rich organic phase with a calcium hydroxide solution in a tertiary stage to form a third mixture, wherein the pH of the third mixture is at least about 11; and separating an aqueous phase calcium nitrate-rich strip solution from the third mixture to form a second organic phase composition in the tertiary stage.

In some embodiments, the weak organic acid has a pKa value in water in the range of about 8 to about 12.

These and other non-limiting characteristics of the disclosure are more particularly disclosed below.

BRIEF DESCRIPTION OF THE DRAWINGS

The following is a brief description of the drawings, which are presented for the purposes of illustrating the exemplary embodiments disclosed herein and not for the purposes of limiting the same.

DETAILED DESCRIPTION

A more complete understanding of the components, processes and apparatuses disclosed herein can be obtained by reference to the accompanying drawings. These figures are merely schematic representations based on convenience and the ease of demonstrating the present disclosure, and are, therefore, not intended to indicate relative size and dimensions of the devices or components thereof and/or to define or limit the scope of the exemplary embodiments.

Although specific terms are used in the following description for the sake of clarity, these terms are intended to refer only to the particular structure of the embodiments selected for illustration in the drawings, and are not intended to define or limit the scope of the disclosure. In the drawings and the following description below, it is to be understood that like numeric designations refer to components of like function.

The singular forms "a," "an," and "the" include plural referents unless the context clearly dictates otherwise.

As used in the specification and in the claims, the term "comprising" may include the embodiments "consisting of" and "consisting essentially of." The terms "comprise(s)," "include(s)," "having," "has," "can," "contain(s)," and variants thereof, as used herein, are intended to be open-ended transitional phrases, terms, or words that require the presence of the named components/steps and permit the presence of other components/steps. However, such description should be construed as also describing compositions or processes as "consisting of" and "consisting essentially of" the enumerated components/steps, which allows the presence of only the named components/steps, along with any impurities that might result therefrom, and excludes other components/steps.

Numerical values in the specification and claims of this application should be understood to include numerical values which are the same when reduced to the same number of significant figures and numerical values which differ from the stated value by less than the experimental error of conventional measurement technique of the type described in the present application to determine the value.

All ranges disclosed herein are inclusive of the recited endpoint and independently combinable (for example, the range of "from 2 to 10" is inclusive of the endpoints, 2 and 10, and all the intermediate values).

The term "about" can be used to include any numerical value that can vary without changing the basic function of that value. When used with a range, "about" also discloses the range defined by the absolute values of the two endpoints, e.g. "about 2 to about 4" also discloses the range "from 2 to 4." The term "about" may refer to plus or minus 10% of the indicated number.

As used herein, the term "weak organic acid" refers to a water insoluble organic compound which will provide an acidic proton and have a pKa as measured in water in the range of about 8 to about 12.

The treatment of waste water by solvent extraction has been studied by many groups. For example, the Hydroflex technology of Winner Water Services employs solvent extraction with a quaternary amine to remove sulfate ions from waste water. This technology uses sulfate loading and stripping (with a strong base solution such as sodium carbonate) to extract the sulfate and form a weak sulfate solution with some remaining sodium carbonate in solution. Three challenges this technology has to meet for success are to: (1) increase the strength of the sulfate strip solution to enable crystallization and sale of sodium sulfate; (2) increase the efficiency of the use of sodium carbonate as the stripping agent; and (3) prevent the release of contaminants into the raffinate solution from the initial loading (i.e., carbonate).

The present disclosure relates to methods for removing various anions from waste water. The methods involve the selective separation of nitrate ions away from sulfate and selenate ions. In the methods, an aqueous phase waste water stream is treated with an organic phase composition containing a quaternary amine and a weak organic acid.

The weak organic acid provides a pH dependent counterion, thereby providing a means of controlling the pH behavior of the quaternary amine to extract and strip the desired anion. In the absence of a weak organic acid, the quaternary amine functionality is independent of pH and stripping of the desired anion using aqueous alkaline solutions requires very high concentrations of the alkaline reagent.

The quaternary amine is usually provided in the form of a salt that includes a cation of the following formula (I):

(I)

where the R groups $R_1$ through $R_4$ are independently a hydrocarbon radical having up to 25 carbon atoms, or a covalent bond to an ion exchange resin matrix or backbone. An exemplary quarternary amine salt is Aliquat 336, which contains a mixture of N-methyl-N-trioctyl ammonium ions and N-methyl-N-tridecyl ammonium ions that meet Formula (I).

The weak organic acid has a pKa as measured in water in the range of about 8-12. The weak organic acid is essentially water insoluble, or provisions must be made to continuously replenish the level of the weak acid to maintain an effective concentration of the weak organic acid in the reagent phase.

Non-limiting examples of weak organic acids, those providing an acidic proton, having suitable solubility characteristics and pKa behavior are alkylphenols, such as nonylphenol, dodecylphenol; fatty beta-diketones, such as 1-phenyl-1,3-isodecanedione; alkylbenzenesulfonamides, such as dodecylbenzenesulfonamide; phenolic aldehydes, such as dodecylsalicylaldehyde; phenolic ketones, such as 5-nonyl-2-hydroxyphenyl methyl ketone, and hydroxyaryl aldoximes or ketoximes, such as 2-hydroxy-5-(nonyl or dodecyl) benzaldoxime and 2-hydroxy-5-(nonyl or dodecyl)phenyl methyl ketone oxime.

The foregoing compounds (phenols, phenolic aldehydes, phenolic oximes, sulfonamides and beta-diketones) all provide an acidic proton and may be further illustrated generally by the formulae (II) or (III) or (IV) or (V):

where $R_a$ is a hydrocarbon group having up to 25 carbon atoms, n is an integer of 0 to 4, and A is H or an electron-withdrawing substituent selected from the group consisting of chloro, bromo, —C(=O)$R_b$, or —C(=NOH)$R_b$, where $R_b$ is H or a hydrocarbon group having 1 to about 25 carbon atoms, and provided that the total number of carbon atoms in $R_a$ and $R_b$ is from 6-30;

where $R_5$ is H or a hydrocarbon group having 1 to about 25 carbon atoms, $R_6$ is a hydrocarbon group having 1 to about 25 carbon atoms, $R_7$ is a hydrocarbon group having 1 to about 25 carbon atoms, and provided the total number of carbon atoms in $R_5$, $R_6$ and $R_7$ is 10 to 30; and where $R_6$ is as defined above, $R_8$ is H or a hydrocarbon group having 1 to about 25 carbon atoms, and provided the total number of carbon atoms in $R_6$ and $R_8$ is 10 to 30.

In the foregoing formulae, the preferred hydrocarbon groups $R_a$ are alkyl groups, such as heptyl, octyl, nonyl, decyl or dodecyl, and n is 1. $R_6$ is optionally an unsubstituted phenyl group, $R_5$ is optionally H, and $R_7$ is optionally heptyl. A may be selected from H, —C(=O)$R_b$ or —C(=NOH)$R_b$, where $R_b$ is H or methyl. In the formulae above, the term hydrocarbon includes aliphatic, cycloaliphatic, aromatic, and aliphatic substituted aromatic groups, and the groups may be the same or different, saturated or unsaturated, and straight or branched chain.

In general, weak organic acids having a pKa in the range of 8-12 in water will be acceptable, including the range of about 9-11. In some embodiments, about 1 to about 5 moles of weak acid per mole of quaternary amine functionality is employed to achieve good stripping performance. Optimal performance will vary depending on the specific weak acid and specific quaternary amine, and the amounts thereof. In some embodiments, a ratio of about 2-3 moles of an alkylphenol, such as nonylphenol, per mole of a quaternary amine, such as tri($C_8$-$C_{10}$)methyl ammonium chloride, is used.

The reagent (quaternary amine and weak organic acid) are soluble in an organic solvent which is immiscible with the aqueous solution. One exemplary organic solvent is Orfom® SX12, which is a petroleum distillate containing hydrocarbons having a specific gravity of 0.824 g/ml at 15.6° C. and a viscosity of 2.5 mm$^2$/sec at 25° C.

In some embodiments, the pH of the initial aqueous solution that is to be treated using the methods of the present disclosure, i.e. the mine-affected water, can be from about 8 to about 2. Put another way, this water can be very acidic. Again, though, it is contemplated that the initial aqueous solution can come from any source, so long as it needs to be treated.

Figure 1:
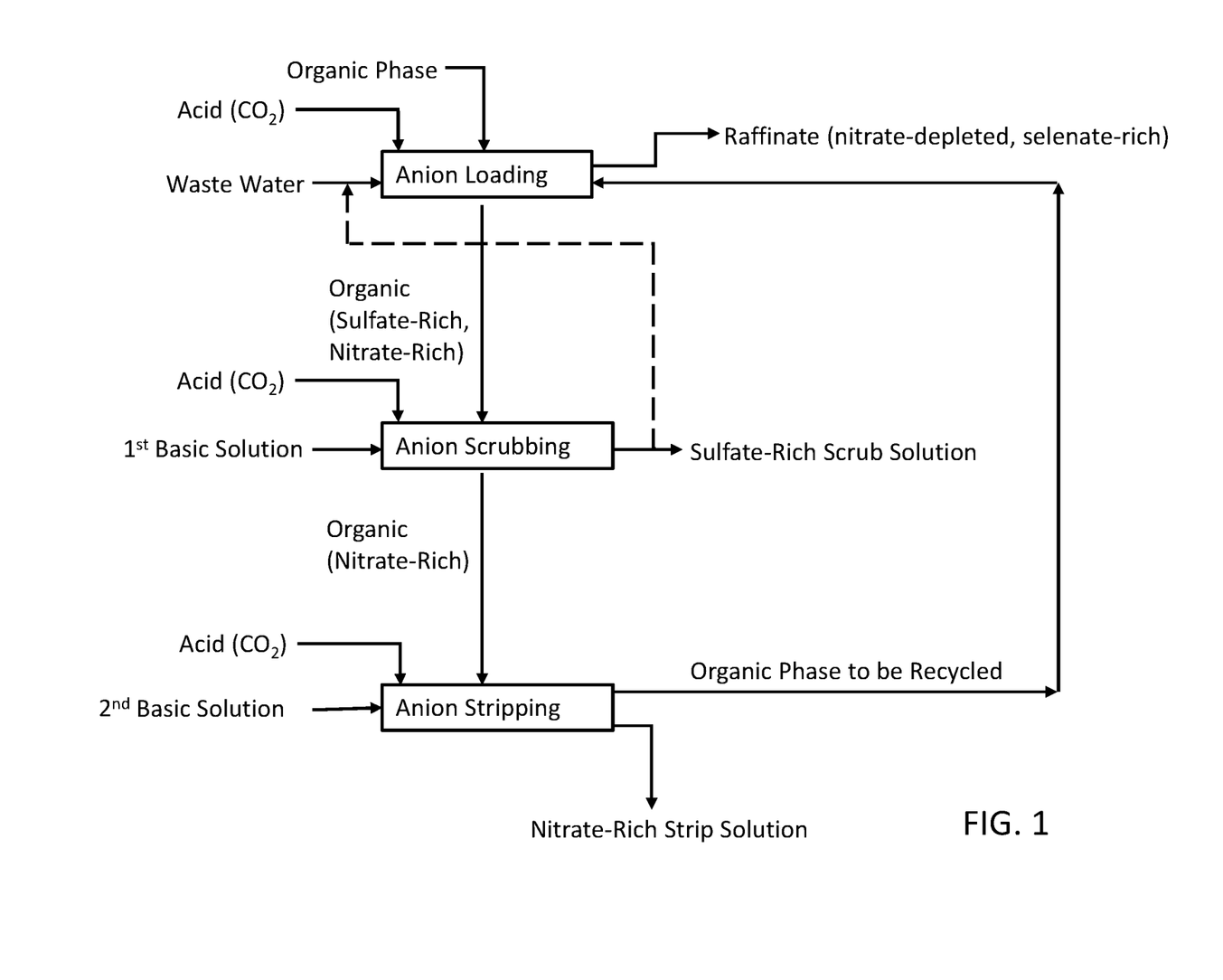
FIG. 1 is a flow chart illustrating a method for removing anions from waste water in accordance with some embodiments of the present disclosure.

Generally, the water-immiscible organic phase composition containing the quaternary amine and the weak organic acid preferentially extracts the desired anions (i.e. nitrates) from the primary aqueous solution. After separation of the organic phase from the aqueous phase due to immiscibility, the organic phase containing the desired anions is then stripped by contact with various basic aqueous solutions to strip any impurities out, and then to strip the desired anion from the organic phase. Anions can be preferentially stripped to obtain further solutions that are rich in a particular anion. The relative starting amounts of such anions can vary greatly. For example, mine-affected water may contain 0.001 to 1000 ppm of selenate, 100-100,000 ppm of sulfate, 10-1000 ppm of nitrate, FIG. 1 is a flow chart illustrating exemplary methods in accordance with some embodiments of the present disclosure. The methods include a primary stage (i.e., anion loading), a secondary stage (i.e., anion scrubbing), and a tertiary stage (i.e., anion stripping). Each stage may independently use any suitable equipment, including mixer-settlers or agitated or pulsed columns.

In the first step of FIG. 1, in the stage labeled "Anion Loading", the primary aqueous solution (i.e. the mine-affected waste water) is combined with the initial organic phase composition containing the quaternary amine and weak organic acid in a primary stage to form a first mixture. The first mixture may have a pH of about 2 to about 10, or from about 4 to about 8, or from about 2 to about 9, or from about 6 to about 9. The volumetric ratio of the primary aqueous solution to the initial organic phase composition may be about 2:1 or greater, or in some embodiments is about 1:1 or lower. More broadly, this volumetric ratio can range from about 0.1:1 to about 10:1.

The chemistry of the primary stage (i.e., loading) may be described by the following reactions, wherein nitrate is used as the target species along with sulfate as the co-loaded impurity, the solvent is a mixture of a quaternary amine (represented by AQ$^+$; e.g., Aliquat 336 cation) and a weak acid (represented by NP$^-$; e.g., nonylphenol anion):

As indicated by these two chemical reactions, the nitrates and sulfates in the aqueous solution move from the aqueous phase into the organic phase. The first mixture is then separated into a nitrate-depleted raffinate and a nitrate-containing organic phase. The nitrate-containing organic phase can be described as enriched in nitrates relative to the initial organic phase composition. In this regard, the organic phase containing the quaternary amine and weak organic acid preferentially absorbs or extracts nitrates and sulfates from the primary aqueous solution, but may contain some selenate as well. It is noted that in absolute amounts, the raffinate generally contains more nitrate than selenate, and the raffinate also contains more sulfate than nitrate.

By way of comparison, if the incoming primary aqueous solution contained 100 parts of selenate, 100 parts of sulfate, and 100 parts of nitrate, the raffinate would contain 90-99 parts of selenate, 90-99 parts of sulfate, and 0-10 parts of nitrate. The incoming organic phase composition could contain negligible amounts of selenate, sulfate and nitrate. The exiting nitrate-containing organic phase could contain 1-10 parts of selenate, 1-10 parts of sulfate, and 90-100 parts of nitrate.

The nitrate-containing organic phase then travels to the secondary stage, which is labeled "Anion Scrubbing" in FIG. 1. It is noted that the nitrate-containing organic phase generally also contains sulfates, and potentially a small amount of selenium. In the secondary stage, the organic phase is contacted with a first basic aqueous solution to form a second mixture. The pH of the second mixture is higher than that of the first mixture in the primary stage (i.e. more alkaline). The first basic aqueous solution may have a pH of about 8 to about 10. The volumetric ratio of the first basic aqueous solution to the organic phase may be from about 0.1:1 to about 10:1. The chemistry of this secondary stage (i.e., scrubbing or washing) may be described by the following reaction:

As particularly noted, the first basic solution uses sodium hydroxide, which deprotonates the organic acid to create the organic acid anion NP$^-$. This organic acid anion competes with the nitrate and sulfate to form a neutral complex with the quaternary amine cation. Due to the order of strength of competition, the sulfate is preferentially displaced compared to the nitrate, such that sulfate is formed in solution while the nitrate remains in the organic phase. In other words, sulfate is efficiently stripped from the organic phase, while the nitrate stripping is much lower.

As a result, a large portion of any sulfates present in the organic phase move into the first basic solution. The second mixture is then separated into a sulfate-containing aqueous scrub solution and an organic phase. Any selenate generally passes into the aqueous scrub solution as well. This organic phase exiting the secondary stage can be described as being sulfate-depleted, or as being rich in nitrates. Again, the sulfate-containing scrub solution can contain nitrates, but contains much more sulfate in comparison. Similarly, the nitrate-rich organic phase can contain some sulfate, but contains much more nitrate by comparison. If desired, a portion of the sulfate-containing scrub solution can be recycled to the primary stage, as indicated by the dashed line of FIG. 1.

The ratio of nitrate to sulfate (ppm/ppm) in the exiting nitrate-rich organic phase may be from about 10:1 to about 1000:1. The ratio of nitrate to selenate (ppm/ppm) in the exiting nitrate-rich organic phase may also be from about 10:1 to about 1000:1.

Finally, the nitrate-rich organic phase then travels to the tertiary stage, which is labeled "Anion Stripping" in FIG. 1. Here, the organic phase is contacted with a second basic aqueous solution to form a third mixture. The second basic aqueous solution may have a pH of about 11 to about 14. The pH of the third mixture is higher than that of the second mixture in the secondary stage (i.e. more alkaline). The volumetric ratio of the second basic aqueous solution to the organic phase may be from about 0.1:1 to about 10:1. The chemistry of the tertiary stage (i.e., stripping) may be described by the following reaction:

$Ca^{2+}+2OH^-+2(AQNO_3)_{org}+2NPH_{org}=Ca(NO_3)_2+2(AQ^+\cdot NP^-)_{org}+2H_2O$ As particularly noted, the second basic solution uses calcium hydroxide, which deprotonates the organic acid to create the organic acid anion $NP^-$. This organic acid anion again competes with the nitrate to form a neutral complex with the quaternary amine cation. Due to the order of strength of competition, the nitrate is displaced and moves to the solution while the original weak acid remains in the organic phase. As a result, the nitrates in the organic phase move into the second basic solution. It is noted that the quaternary amine ($AQ^+$) and the weak organic acid ($NP^-$) are now back in the organic phase. The third mixture is then separated into a nitrate-rich aqueous strip solution and a secondary organic phase composition. The secondary organic phase composition is then recycled back to the primary stage to continue the overall anion recovery process.

The ratio of nitrate to sulfate (ppm/ppm) in the entering nitrate-rich organic phase may be from about 10:1 to about 1000:1. The ratio of nitrate to selenate (ppm/ppm) in the entering nitrate-rich organic phase may also be from about 10:1 to about 1000:1. The exiting nitrate-rich aqueous strip solution may have a concentration of about 1 g/L to about 500 g/L of nitrate. The ratio of nitrate to sulfate (ppm/ppm) and the ratio of nitrate to selenate (ppm/ppm) in the nitrate-rich aqueous strip solution may each be from about 10:1 to about 1000:1. The exiting secondary organic phase composition ideally contains negligible amounts of nitrate. No sulfate/selenate should be present in the nitrate-rich organic phase entering the tertiary stage; however, any sulfate/selenate that is present (at best a vanishingly small amount) should ideally remain in the secondary organic phase composition to be returned to the primary stage and exit in the raffinate.

The result of these methods is that a waste water feed stream which contains selenium, sulfates, and nitrates is separated into two different water streams: a nitrate-depleted raffinate, a sulfate-containing scrub solution, and a nitrate-rich strip solution. Control of the pH permits the separation of the nitrate anions from the other anions. The different water streams can then be sent to different purification processes to obtain cleansed water, without concern that the further purification process of, for example selenates, will be contaminated or rendered less effective by the presence of nitrates.

It is further contemplated that the methods may include co-extracting two or more anions in a given stage and then selectively stripping the anions into separate product streams. For example, there may be two anion stripping stages making separate products. It is further contemplated that the conditions during extraction can be altered to achieve high recovery of sulfate, selenate, and nitrate. In this case, selective stripping could produce one aqueous strip stream that is relatively rich in sulfate and selenate, and a second aqueous stream that is relatively rich in nitrate. Controlling variables such as the volumetric ratio of the aqueous phase to the organic phase (A/O ratio), reagent concentration on the extraction side, pH, and the concentration of the stripping solutions can be used to give a high degree of flexibility in designing a solvent extraction process to meet the needs of a particular water source.

It should be noted that a mineral acid or acidic gas may be used at any stage of the process (i.e. anion loading, anion scrubbing, or anion stripping) to control the pH of each stage as well. Generally, any acid may be used as long as the acid does not interfere with the loading of nitrate. Examples of mineral acids that may be used include sulfuric acid and carbonic acid. Examples of acidic gases that may be used include carbon dioxide ($CO_2$) and sulfur dioxide ($SO_2$). Examples of acids that should not be used include nitric acid and perchloric acid. In particular embodiments, carbon dioxide is used for pH control. Use of carbon dioxide can increase the amount of nitrate loading at each stage of the process.

The following examples are provided to illustrate the compositions, articles, and methods of the present disclosure. The examples are merely illustrative and are not intended to limit the disclosure to the materials, conditions, or process parameters set forth therein.

EXAMPLES

Example 1

A solution was prepared containing 8.92 g/L of LIX 7820, 1.3 g/L dodecanol, and the balance was ORFOM® SX-12 diluent (i.e. organic phase). LIX 7820 is a solvent mixture of a quaternary amine (Aliquat 336) and 4-nonylphenol at a molar ratio of 1:2. The effective concentration of the Aliquat 336 was 0.0047M.

Table 2 below recites the concentrations of nitrate, sulfate, selenium, and bicarbonate in aqueous and LIX 7820 organic solution at different A/O ratios (aqueous feed composition: 264 mg/L $NO_3^-$, 2050 mg/L $SO_4^{2-}$, 0.373 mg/L Se, and 458 mg/L $HCO_3^-$). "A/O" indicates the volumetric ratio of aqueous solution to organic phase.

TABLE 2

| | Aqueous phase/mg $L^{-1}$ | | | | Organic phase/mg $L^{-1}$ | | |
|---|---|---|---|---|---|---|---|
| A/O | $NO_3^-$ | $SO_4^{2-}$ | Se | pH | $NO_3^-$ | $SO_4^{2-}$ | Se |
| 0.1 | 21.5 | 1582 | 0.246 | 9.12 | 24.7 | 36 | 0.0118 |
| 0.2 | 35.6 | 1698 | 0.268 | 8.75 | 43.8 | 49 | 0.0157 |
| 0.5 | 75.3 | 1830 | 0.320 | 8.39 | 89.9 | 64 | 0.0241 |
| 1 | 122.7 | 1910 | 0.352 | 8.21 | 128 | 58 | 0.0219 |
| 2 | 174.0 | 1990 | 0.360 | 8.15 | 155 | 47 | 0.0188 |
| 5 | 215.7 | 2020 | 0.372 | 8.11 | 170 | 35 | 0.0139 |
| 10 | 236.5 | 2030 | 0.375 | 8.08 | 175 | 29 | 0.0129 |

Figure 2:
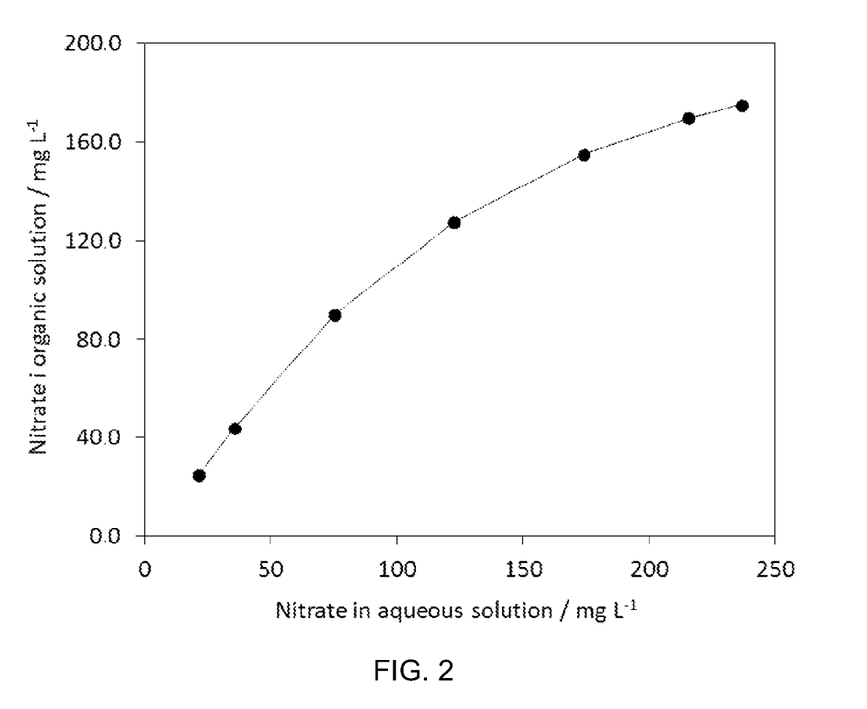
FIG. 2 is a graph showing the nitrate loading isotherm for LIX 7820 organic solution. The y-axis runs from 0 to 200 mg/L in increments of 40. The x-axis runs from 0 to 250 in increments of 50 mg/L.
Figure 3:
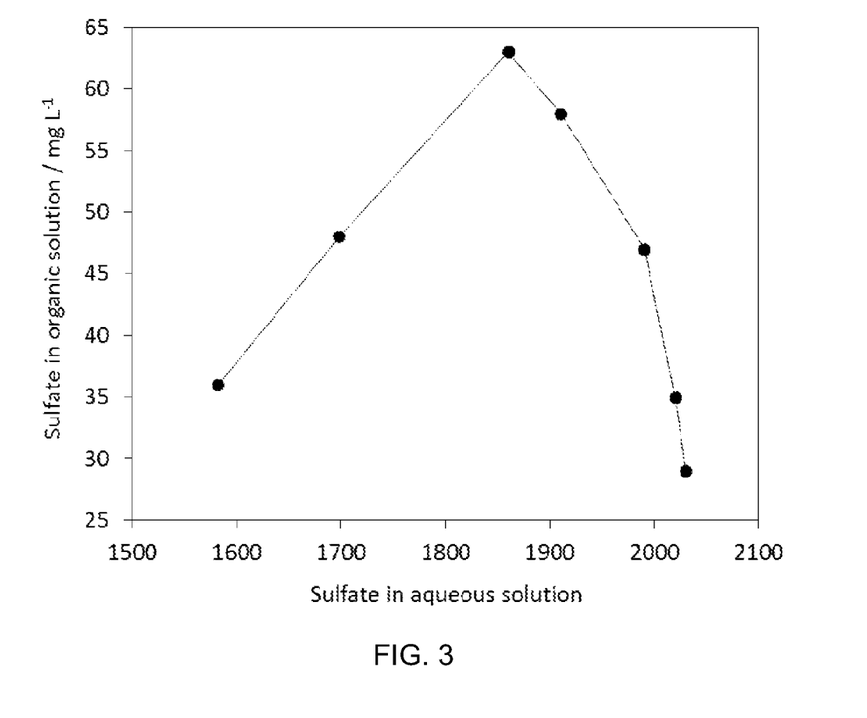
FIG. 3 is a graph showing the sulfate loading isotherm for LIX 7820 organic solution. The y-axis runs from 25 to 65 mg/L in increments of 5. The x-axis runs from 1500 to 2100 in increments of 100 mg/L.
Figure 4:
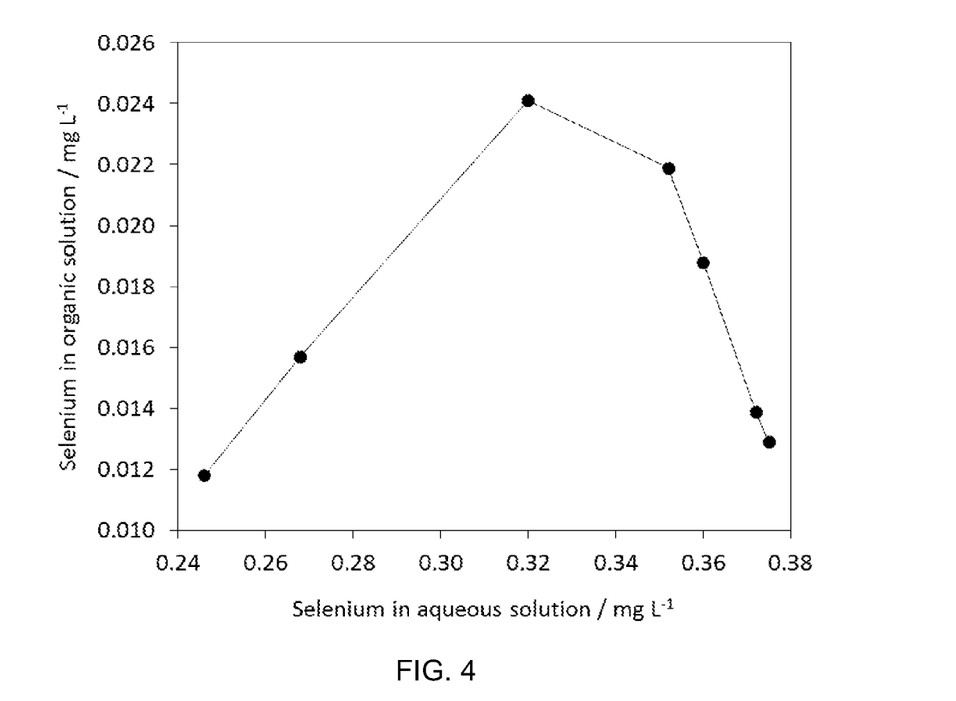
FIG. 4 is a graph showing the selenium loading isotherm for LIX 7820 organic solution. The y-axis runs from 0.010 to 0.026 mg/L in increments of 0.002. The x-axis runs from 0.24 to 0.38 in increments of 0.02 mg/L.

The loading isotherms of nitrate, sulfate, and selenate are shown in FIGS. 2-4, respectively. The nitrate loading generally increased at a decreasing rate with increasing NO ratio (nitrate concentration in the aqueous solution) as it approached its loading capacity (292 mg/L). With increasing NO ratio from 0.1 to 10, the sulfate loading increased from 38 to a maximum of 64 before declining to 29 mg/L while the selenium loading increased from 0.0118 to a maximum of 0.0241 before declining to 0.0129 mg/L.

Table 3 below recites the distribution ratios of nitrate, sulfate, and selenate and separation factors of nitrate to sulfate and selenate for LIX 7820 organic solution.

TABLE 3

| A/O | D(NO$_3$-) | D(SO$_4^{2-}$) | D(SeO$_4^{2-}$) | SF(NO$_3$-/ SO$_4^{2-}$) | SF(NO$_3$-/ SeO$_4^{2-}$) |
|---|---|---|---|---|---|
| 0.1 | 1.2 | 0.023 | 0.048 | 50 | 24 |
| 0.2 | 1.2 | 0.029 | 0.059 | 43 | 21 |
| 0.5 | 1.2 | 0.035 | 0.075 | 34 | 16 |
| 1 | 1.0 | 0.030 | 0.062 | 34 | 17 |
| 2 | 0.89 | 0.024 | 0.052 | 38 | 17 |
| 5 | 0.79 | 0.017 | 0.037 | 45 | 21 |
| 10 | 0.74 | 0.014 | 0.034 | 52 | 22 |

The distribution ratio of nitrate decreased from 1.2 to 0.74 with increasing A/O ratio from 0.1 to 10. The distribution ratio of sulfate increased from 0.023 to 0.030 with increasing NO ratio from 0.1 to 1 and then dropped to 0.014. The distribution ratio of selenate also increased from 0.048 to 0.075 and then decreased to 0.034 as the A/O ratio increased from 0.1 to 10. The separation factors of nitrate to sulfate and nitrate to selenate ranged from 34 to 52 and 16 to 24, respectively, over the range of A/O ratio from 0.1 to 10. An increased A/O ratio provides a high loading of the organic phase with nitrate.

This data shows that nitrate is loaded most strongly by LIX 7820 with sulfate and selenate relatively weakly loaded. It is contemplated that the concentration of the weak organic acid, or the composition of the organic phase, can be changed.

Figure 5:
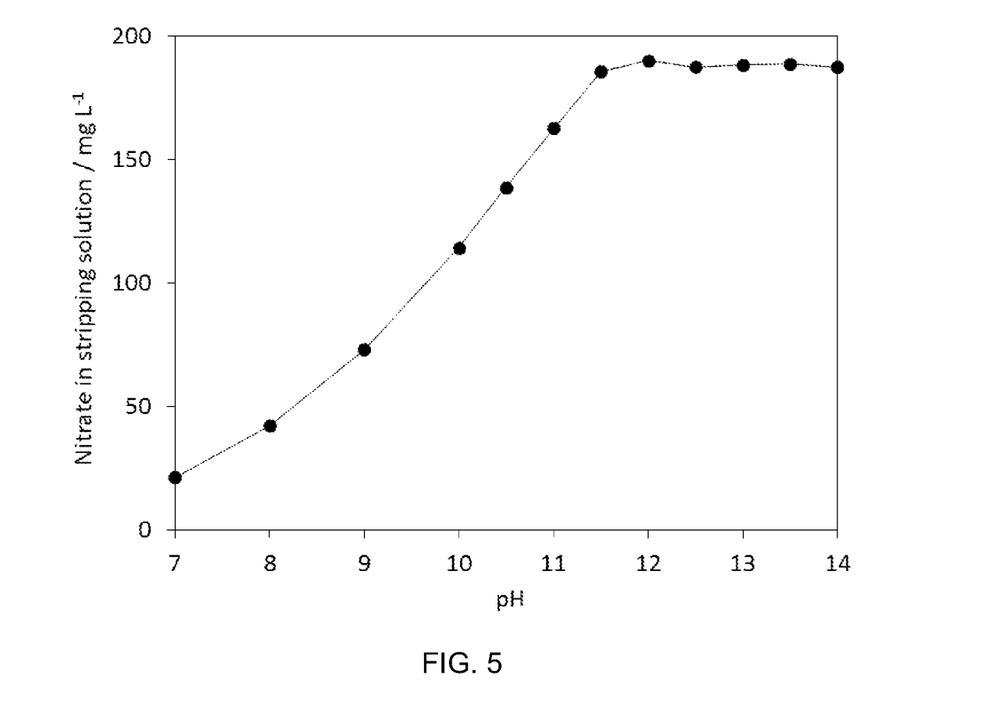
FIG. 5 is a graph showing nitrate stripping as a function of pH at a ratio of aqueous phase volume to organic phase volume of 1. The y-axis runs from 0 to 200 mg/L in increments of 50. The x-axis is pH and runs from 7 to 14 in increments of 1.
Figure 6:
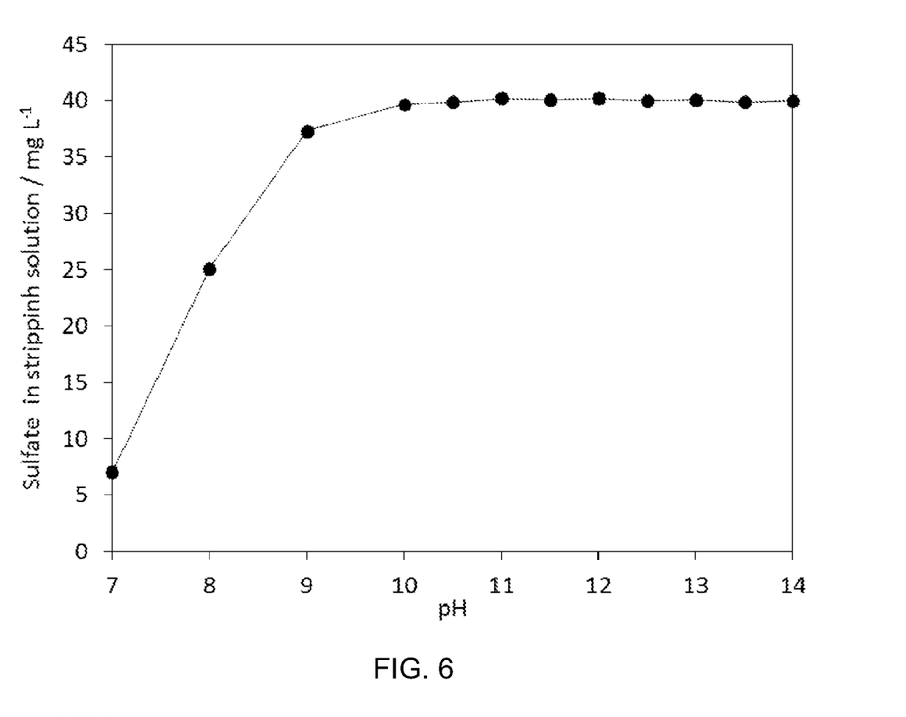
FIG. 6 is a graph showing sulfate stripping as a function of pH at a ratio of aqueous phase volume to organic phase volume of 1. The y-axis runs from 0 to 45 mg/L in increments of 5. The x-axis is pH and runs from 7 to 14 in increments of 1.
Figure 7:
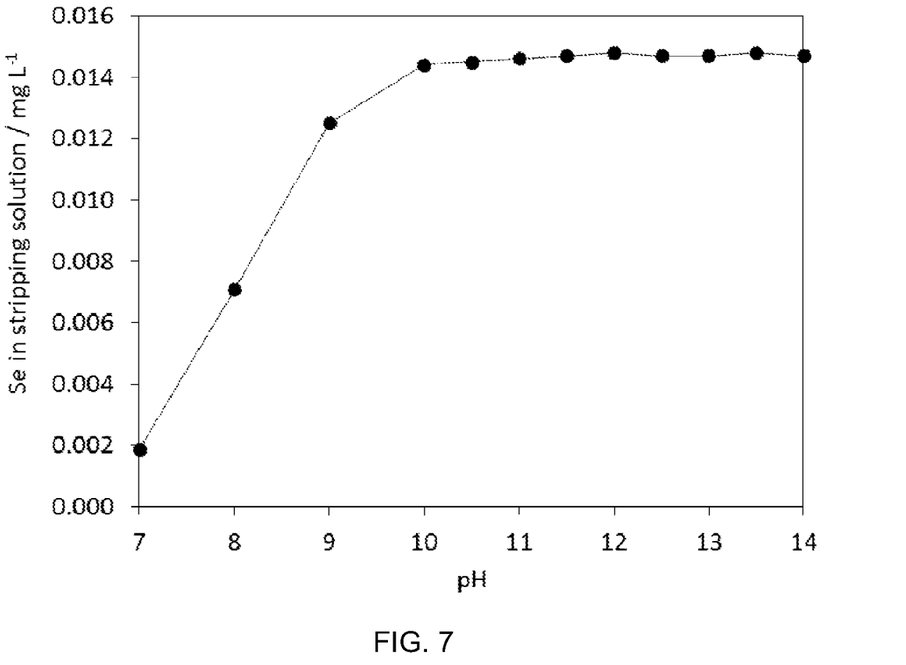
FIG. 7 is a graph showing selenate stripping as a function of pH at a ratio of aqueous phase volume to organic phase volume of 1. The y-axis runs from 0.000 to 0.016 mg/L in increments of 0.002. The x-axis is pH and runs from 7 to 14 in increments of 1.

Nitrate-, sulfate-, and selenate-loaded organic solutions were prepared by contacting organic solution with pond water at an A/O ratio of 5/1 for three times. The stripping of nitrate, sulfate, and selenate was conducted by contacting the nitrate-, sulfate-, and selenate-loaded organic solution with aqueous stripping solution at an A/O ratio of 1 and different pHs by adding sodium hydroxide solution. The effect of pH on the stripping of nitrate, sulfate, and selenate is illustrated in FIGS. 5-7, respectively. The nitrate concentration in the stripping solution first increased with increasing pH from 7 to 11.5 and the changed very little with further increasing pH (FIG. 5). This indicates that the nitrate was completely stripped from the organic solution at a pH of 11.5. The sulfate and selenium concentrations in the stripping solution first increased with increasing pH from 7 to 10 and then stayed relatively constant with increasing pH (FIGS. 6 and 7). Sulfate and selenium were completely stripped from the organic solution at a pH of 10.

These results indicate that LIX 7820 could be used to load nitrate selectively from mine/pond water. Sulfate and selenate can then be easily washed using dilute sodium hydroxide solution. In particular, pH-controlled stripping can remove sulfate from a nitrate-loaded organic phase.

Example 2

Three different aqueous solutions (labeled HDS brine, Nest 1, and Nest 2) were prepared by adding the chlorides of sodium, magnesium, and potassium according to the compositions given in Table 4. Na$_2$SeO$_4$ was added to reach the selenium target concentration. Ca(NO$_3$)$_2$ was added to reach the target concentration of nitrate. CaSO$_4$ was added to reach the target concentration of sulfate. Calcium hydroxide was added such that the solution pH was adjusted to 11.

TABLE 4

| Solution | HDS brine | Nest 1 | Nest 2 |
|---|---|---|---|
| S as SO$_4^{2-}$/g L$^{-1}$ | 0.55 | 0.55 | 0.55 |
| Na as NaCl/g L$^{-1}$ | 0.044 | 0.154 | 0.539 |
| Mg as MgC$_2$I/g L$^{-1}$ | 0.0097 | 0.03395 | 0.1188 |
| K as KCl/g L$^{-1}$ | 0.028 | 0.098 | 0.343 |
| Se as Na$_2$SeO$_4$/g L$^{-1}$ | 0.0021 | 0.00735 | 0.0257 |
| N as NO$_3$-/g L$^{-1}$ | 0.2 | 0.7 | 2.45 |

A LIX7820 organic solution was prepared such that Aliquat 336 molar concentration in the organic solution was 1.1 times that of nitrate in the aqueous solution. Dodecanol was added in the same volume as LIX7820. ORFOM SX12 was added as a diluent to make up the remainder volume.

The LIX7820 organic solution was mixed with each of the aqueous solutions at different ratios (A/O) of 10:1, 5:1, 2:1, 1:1, 1:2, 1:5, and 1:10. Sulfuric acid was added such that the sulfuric acid concentration remained equal to that of nitrate to maintain a pH low enough to load nitrate.

Figure 8:
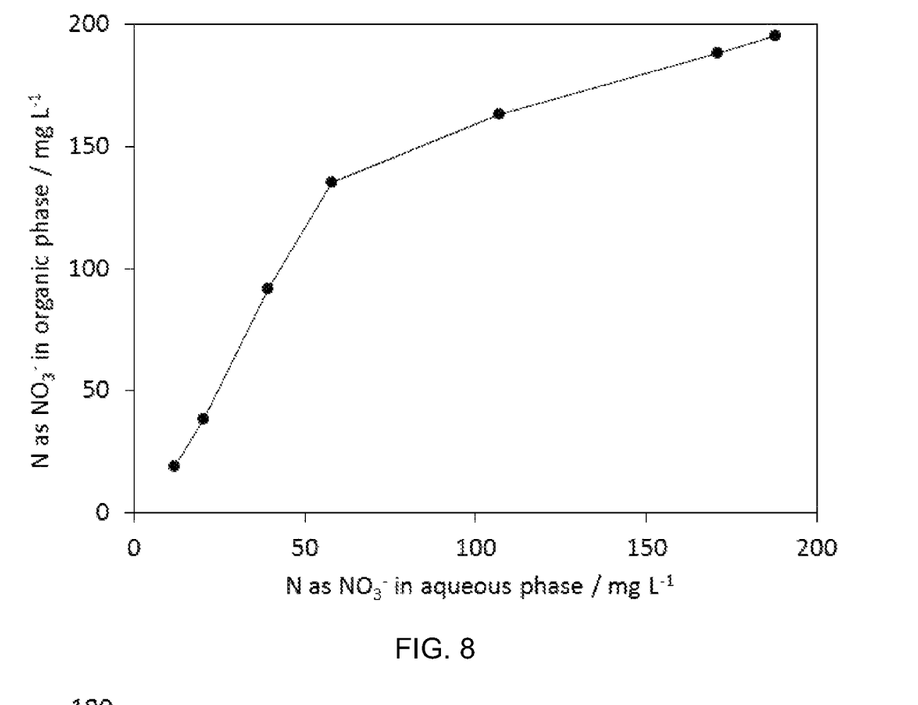
FIG. 8 is a graph showing the nitrate loading isotherm with the addition of sulfuric acid for HDS brine. The y-axis runs from 0 to 200 mg/L in increments of 50. The x-axis runs from 0 to 200 in increments of 50 mg/L.
Figure 9:
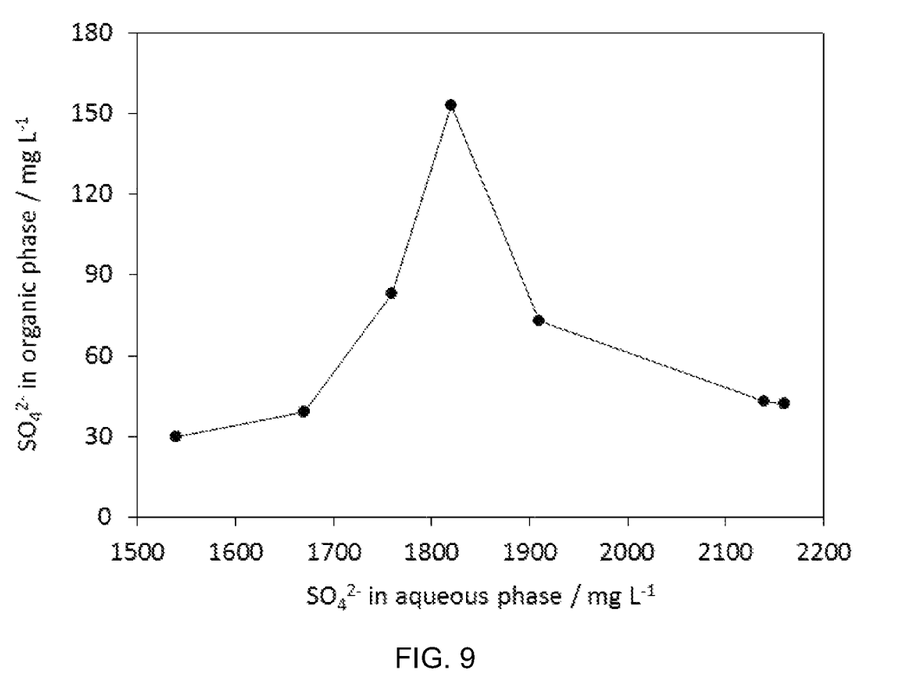
FIG. 9 is a graph showing the sulfate loading isotherm with the addition of sulfuric acid for HDS brine. The y-axis runs from 0 to 180 mg/L in increments of 30. The x-axis runs from 1500 to 2200 in increments of 100 mg/L.
Figure 10:
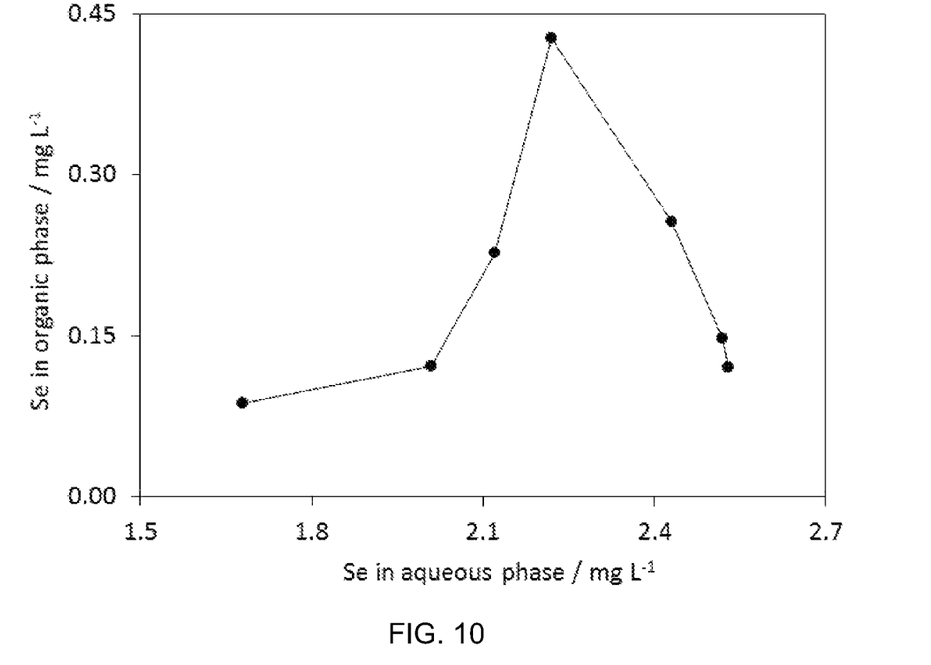
FIG. 10 is a graph showing the selenium loading isotherm with the addition of sulfuric acid for HDS brine. The y-axis runs from 0.00 to 0.45 mg/L in increments of 0.15. The x-axis runs from 1.5 to 2.7 in increments of 0.3 mg/L.
Figure 11:
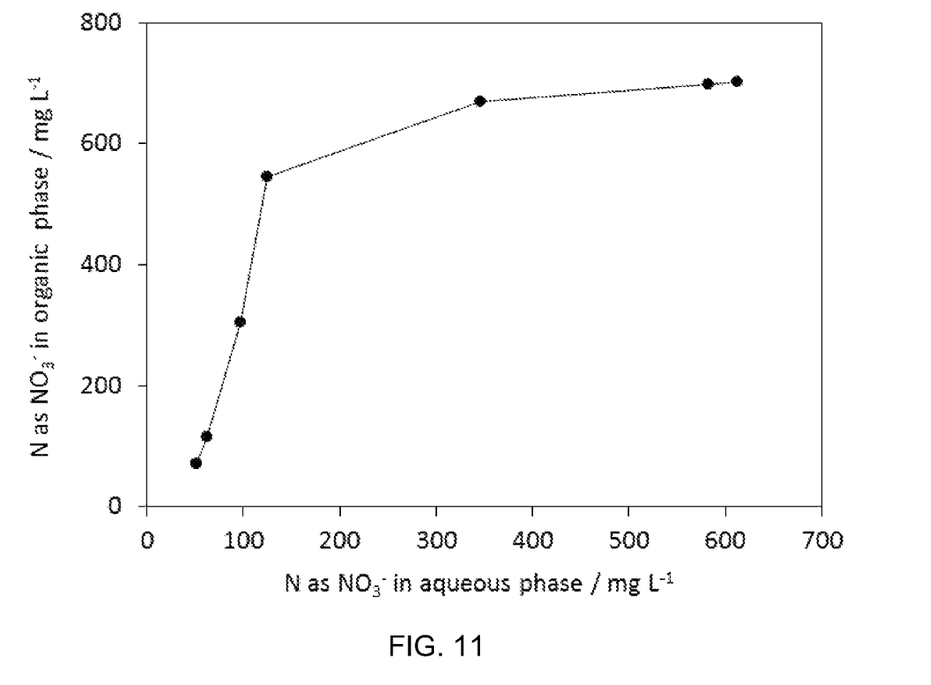
FIG. 11 is a graph showing the nitrate loading isotherm with the addition of sulfuric acid for Nest 1 solution. The y-axis runs from 0 to 800 mg/L in increments of 200. The x-axis runs from 0 to 700 in increments of 100 mg/L.
Figure 12:
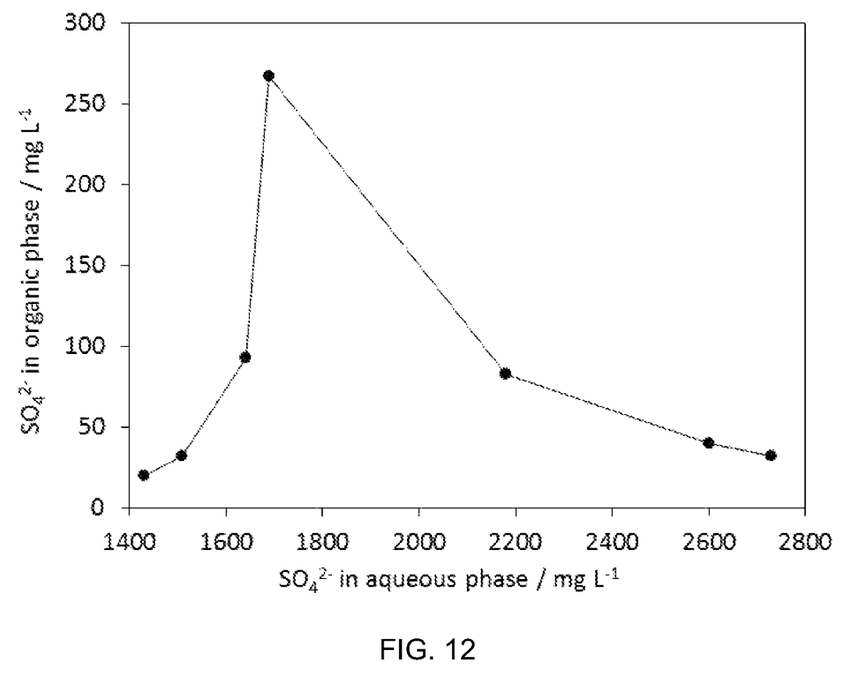
FIG. 12 is a graph showing the sulfate loading isotherm with the addition of sulfuric acid for the Nest 1 solution. The y-axis runs from 0 to 300 mg/L in increments of 50. The x-axis runs from 1400 to 2800 in increments of 200 mg/L.
Figure 13:
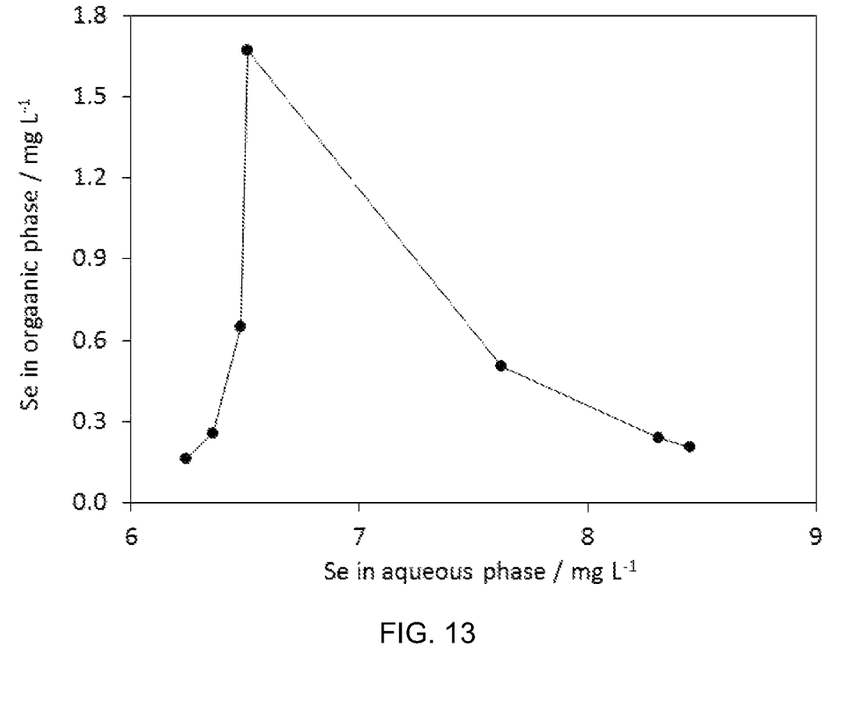
FIG. 13 is a graph showing the selenium loading isotherm with the addition of sulfuric acid for Nest 1 solution. The y-axis runs from 0.0 to 1.8 mg/L in increments of 0.3. The x-axis runs from 6 to 9 in increments of 1 mg/L.
Figure 14:
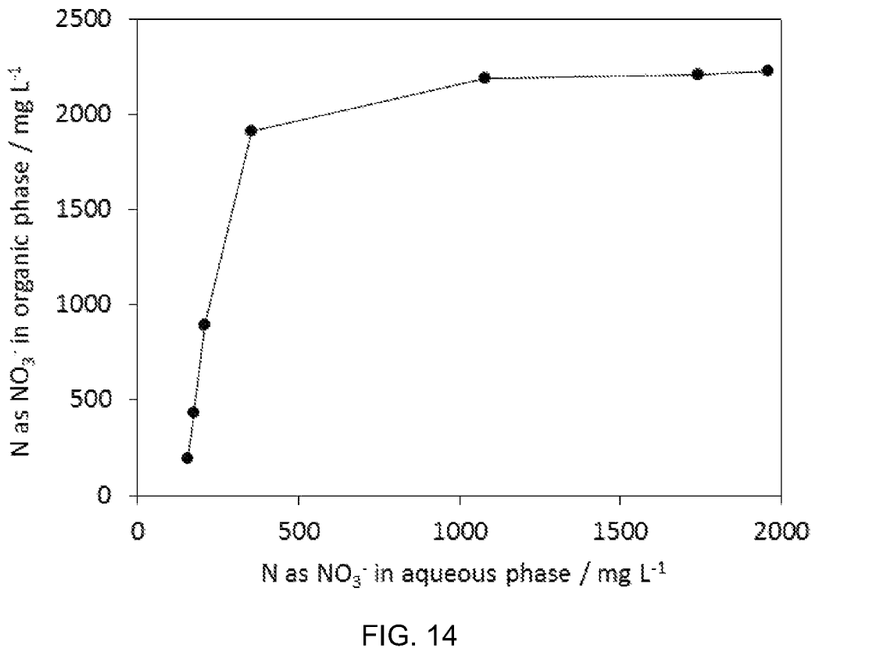
FIG. 14 is a graph showing the nitrate loading isotherm with the addition of sulfuric acid for Nest 2 solution. The y-axis runs from 0 to 2500 mg/L in increments of 500. The x-axis runs from 0 to 2000 in increments of 500 mg/L.
Figure 15:
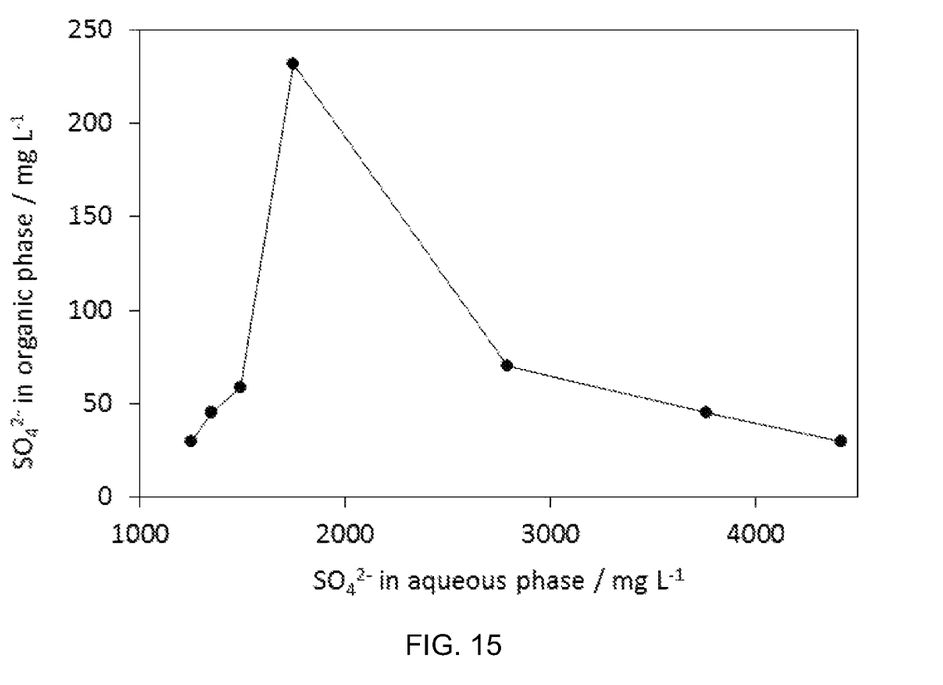
FIG. 15 is a graph showing the sulfate loading isotherm with the addition of sulfuric acid for Nest 2 solution. The y-axis runs from 0 to 250 mg/L in increments of 50. The x-axis runs from 1000 to 4000 in increments of 1000 mg/L.
Figure 16:
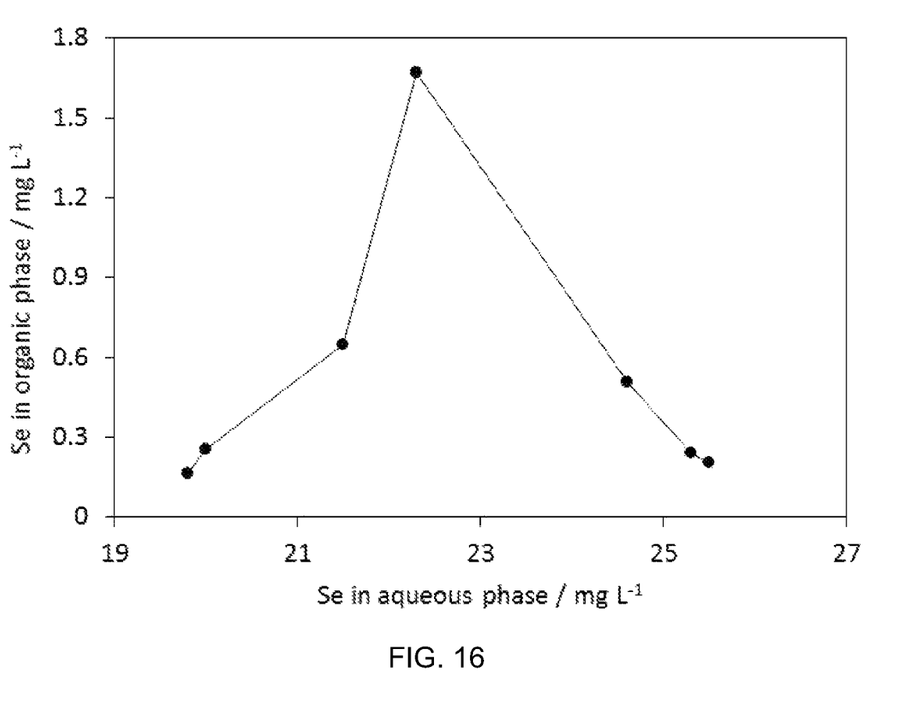
FIG. 16 is a graph showing the selenium loading isotherm with the addition of sulfuric acid for Nest 2 solution. The y-axis runs from 0.0 to 1.8 mg/L in increments of 0.3. The x-axis runs from 19 to 27 in increments of 2 mg/L.

The loading isotherms of nitrate, sulfate, and selenium in the HDS brine solution are seen in FIGS. 8-10. The loading isotherms of nitrate, sulfate, and selenium in the Next 1 solution are seen in FIGS. 11-13. The loading isotherms of nitrate, sulfate, and selenium in the Next 2 solution are seen in FIGS. 14-16.

For all three solutions, sulfate and selenate loading first increased with increasing NO ratio from 1:10 to 1:1. Maximum values were achieved at an A/O ratio of 1. Sulfate and selenate loading then decreased as NO values continued to increase in the range from 1:1 to 10:1.

The present disclosure has been described with reference to exemplary embodiments. Obviously, modifications and alterations will occur to others upon reading and understanding the preceding detailed description. It is intended that the present disclosure be construed as including all such modifications and alterations insofar as they come within the scope of the appended claims or the equivalents thereof.

The invention claimed is:

1. A method for increasing nitrate loading from a primary aqueous solution, comprising:
   contacting the primary aqueous solution with an organic phase composition in a primary stage to form a first mixture, wherein the initial organic phase composition comprises a quaternary amine and a weak organic acid;
   bubbling carbon dioxide through the first mixture; and
   separating the first mixture to obtain a nitrate-depleted raffinate and a nitrate-containing organic phase.

2. A method for increasing loading of a first anion from a primary aqueous solution, comprising:
   contacting the primary aqueous solution with an organic phase composition in a primary stage to form a first mixture, wherein the initial organic phase composition comprises a quaternary amine and a weak organic acid;
   bubbling an acidic gas through the first mixture; and
   separating the first mixture to obtain a first-anion-depleted raffinate and a first-anion-containing organic phase.

3. The method of claim 2, wherein carbon dioxide is used as the acidic gas.

4. The method of claim 2, wherein the weak organic acid has a pKa value in water in the range of about 8 to about 12.

5. The method of claim 2, wherein the pH of the first mixture is about 5 to about 10.

6. The method of claim 2, wherein the volumetric ratio of the primary aqueous solution to the initial organic phase composition is about 2 or greater.

7. A method for increasing loading of a first anion from a primary aqueous solution, comprising:
- contacting the primary aqueous solution with an organic phase composition in a primary stage to form a first mixture, wherein the initial organic phase composition comprises a quaternary amine and a weak organic acid;
- bubbling an acidic gas through the first mixture;
- separating the first mixture to obtain a first-anion-depleted raffinate and a first-anion-containing organic phase;
- contacting the first-anion-containing organic phase with a first basic aqueous solution in a secondary stage to form a second mixture;
- separating the second mixture to remove second anion present in the first-anion-containing organic phase, and obtain a second-anion-containing aqueous scrub solution and a first-anion-rich organic phase;
- contacting the first-anion-rich organic phase with a second basic aqueous solution in a tertiary stage to form a third mixture; and
- separating the third mixture to obtain a first-anion-rich aqueous strip solution and a secondary organic phase composition.

8. The method of claim 7, wherein the first anion is nitrate and the second anion is sulfate.

9. The method of claim 7, wherein at least a portion of the secondary organic phase composition is recycled and used as the initial organic phase composition in the primary stage.

10. The method of claim 7, wherein at least a portion of the second-anion-containing aqueous scrub solution is recycled to the primary stage.

11. The method of claim 7, wherein the pH of the second mixture is greater than the pH of the first mixture, and the pH of the third mixture is greater than the pH of the second mixture.

12. The method of claim 7, wherein the pH of the second mixture and the pH of the third mixture are both alkaline.

13. The method of claim 7, wherein the pH of the second mixture is from about 8 to about 10.

14. The method of claim 7, wherein the pH of the third mixture is about 11 or greater.

15. The method of claim 7, wherein the first basic aqueous solution comprises sodium hydroxide.

16. The method of claim 7, wherein the second basic aqueous solution comprises calcium hydroxide.

17. The method of claim 7, further comprising using a mineral acid or an acidic gas to control the pH of the second mixture or the third mixture.

18. The method of claim 17, wherein carbon dioxide is used as the acidic gas.

19. The method of claim 1, wherein the quaternary amine comprises a mixture of N-methyl-N-trioctyl ammonium ions and N-methyl-N-tridecyl ammonium ions.

20. The method of claim 2, wherein the quaternary amine comprises a mixture of N-methyl-N-trioctyl ammonium ions and N-methyl-N-tridecyl ammonium ions.

* * * * *